3,001,467
METHOD AND APPARATUS FOR UTILIZING WASTE HEAT IN BREWERIES
Heinrich Stäckler, Ruhrblick 8, Herdecke (Ruhr), Germany
Filed Sept. 12, 1957, Ser. No. 683,546
Claims priority, application Germany Sept. 14, 1956
15 Claims. (Cl. 99—278)

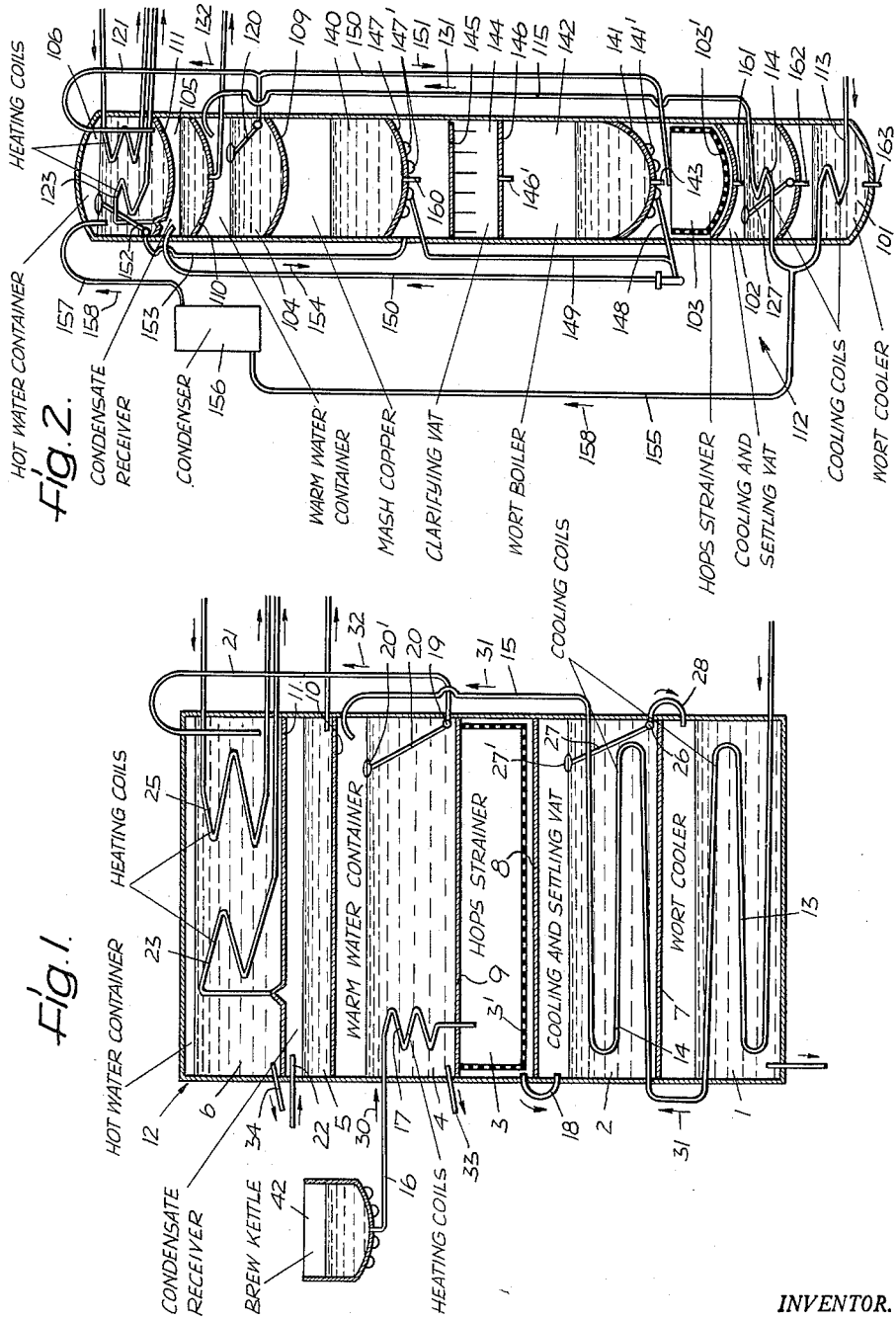

The present invention relates to a process of utilizing waste heat, particularly in breweries, and to new improvements in brewery apparatus.

It is a well-known fact that at present considerable amounts of heat are completely wasted and lost in the brew house of breweries. One of the sources of these losses is, for example, the condensate of the heating steam which is required for preparing the wort, while another consists in the hot gaseous fumes passing off the wort. Also, in cooling the wort, heat is liberated which up to the present time has been utilized only to a minor extent, if at all.

Although it is already known that the condensate of the heating steam and also the cooling water used in cooling the wort may be used for producing warm water, these known processes and apparatus have the disadvantage that, if the excess heat is fully utilized, the volume of luke warm water thus produced is much too large and too cold for possible use in the brewery operation. Therefore, in actual practice, the heat of the steam condensate or the heat liberated during the cooling of the wort is presently utilized for producing warm water only if the condensate or the wort has a very high temperature so that the required amounts of water will be heated sufficiently. The heat, however, which still remains in the partly cooled condensate or the partly cooled wort is then lost completely.

It is one of the objects of the present invention to provide a process and apparatus for utilizing waste heat, and particularly that of brewery apparatus, much more efficiently than has been previously possible and to overcome the disadvantages of the methods and apparatus previously used for this purpose.

According to the present invention, this object may be attained by utilizing the heat which is no longer required for preparing the wort by conducting the cold cooling water after taking up the heat of the wort, together with the condensate of the heating steam from the brew house as a heating source to a place of further use. Such heating source therefore consists of the heat of the condensate of the heating steam which has been expanded in a condensate receiver, the gaseous vapor from the wort boiler and the mash coppers, and the water which has been heated by cooling the wort.

A preferred embodiment of the method according to the invention provides that the water which has been heated in cooling the wort and also in cooling the condenser of the boiler gases may be utilized as warm water. This warm water may then be further heated by the expanded steam of the heating steam condensate. Another modification of the invention consists in passing the hot wort to the hops strainer by conducting it through heating coils provided in the warm water.

The present invention therefore provides for an economic utilization of all of the heat which has been generated in the preparation of the wort, especially in the brew house, and which is no longer required for this purpose.

It is a further object of the present invention to provide a suitable apparatus for carrying out the new method. This apparatus essentially consists in the provision of a warm water container at a point above a vessel which during the brewing process contains a hot substance so that the bottom of the warm water container forms the cover of the vessel containing the hot substance and such bottom and the warm water contained in the upper vessel is thus also heated. A preferred embodiment of the invention therefore provides that the warm water container is mounted above a receiving vessel for collecting the heating steam condensate so that the cover of this receiving vessel forms the bottom of the warm water container. At the inside of the warm water container spiral coils for the expanded steam may be provided which are connected to the upper part of the condensate receiver. The condensate receiver may also be mounted above a warm water container and below a hot water container which is heated by the expanded steam so that the cover of the warm water container will be heated by the condensate.

A further preferred modification of the invention provides that the warm water container is disposed above a vessel in which the wort is prepared, so that the bottom of the warm water container forms the cover of such wort vessel.

The two above-mentioned preferred embodiments may also be combined with each other to attain still greater advantages by arranging the containers one above the other in the following order: a wort cooler, a cooling and settling tank, a hops strainer, a warm water container, a condensate receiver, and a hot water container. In order to permit the cooling water which has been heated by cooling the wort to be utilized as warm water, the invention further provides that the spiral coils for the cooling water pass successively through the wort cooler and the cooling and settling tank and terminate in the warm water container. Due to such arrangement, the warm water which has been heated in the wort cooler and in the cooling and settling tank will then flow into the warm water container and be heated therein by the adjacent containers.

A special advantage of the apparatus according to the invention resides in the fact that the novel arrangement of the various containers not only insures the best possible utilization of the heat but that by arranging the containers above each other the entire cooling system of a brewery plant will take up the least possible space.

Although it has already been proposed to arrange the containers of a brew house above each other in order to save in space, this known arrangement was neither intended for attaining the heat-exchange effect which is the subject matter of the present invention nor did it produce any such effect. The present invention, however, also constitutes an important improvement of this known space-saving arrangement of a brew house insofar as all of the vessels required for the beer production may now be enclosed within a single towerlike container. According to another feature of the invention this may be executed by providing the known unit of superimposed brew house vessels between the warm water container and the hops strainer of the last-mentioned embodiment of the invention so that the bottom of the warm water container forms the cover of the mash copper and the wort boiler is directly connected by its bottom with the hops straining vessel. All of the vessels which are required for producing the wort so as to be ready for the fermentation room may thus be combined within the narrowest possible space. Most pipe lines will become unnecessary except short connecting pieces between the adjacent vessels. The entire system may be assembled of prefabricated parts so that the costs of construction and installation will be considerably reduced. Such centralized arrangement of the entire system also has the advantage that the entire course of the beer production may be easily supervised and controlled from one point.

A preferred embodiment of the invention further provides that the superimposed vessels are formed by installing false or intermediate bottoms within an upright container. The outer shape of the container may then be designed in accordance with the available space, the best utilization of the space usually being attained by making the container of a rectangular cross section.

Further objects, features, and advantages of the present invention will be apparent from the following detailed description thereof, particularly when read with reference to the accompanying drawings, in which—

FIG. 1 shows a simplified diagrammatic vertical cross section of a cooling unit of a brewery plant according to the invention; while FIG. 2 shows a similar vertical cross section of a brewery plant according to the invention which not only comprises the cooling unit but also the brew house.

Referring to the drawings, and first particularly to FIG. 1, the brewing vessels are mounted above each other in the following order: a wort cooler 1, a cooling and settling vat 2, a hops strainer 3, a warm water container 4, a condensate receiver 5, and a hot water container 6. These vessels are formed by the installation of intermediate or false bottoms 7, 8, 9, 10, and 11 in an upright container 12. The cross-sectional shape of this container 12 may be of any suitable design and may be made so as to conform in the best possible manner with the available space.

The warm water container 4 may be filled with the cold water which is heated in the wort cooler 1 and in the cooling and settling vat 2 when cooling the wort through pipes 13, 14, and 15, pipes 13 of which in wort cooler 1 may be in the form of heat-exchanging pipes, while pipes 14 in the cooling and settling vat 2 may be in the form of cooling coils.

The wort is supplied from the brew kettle 42, shown in FIG. 1, through pipes 16 which continue in warm water container 4 in the form of cooling coils 17. The hot wort then flows from the brew kettle through pipes 16 and coils 17 into the hops strainer 3 in which the spent hops are separated from the wort in the usual manner by means of a sieve 3'. Underneath sieve 3', the hops strainer 3 communicates with the cooling and settling vat 2 by means of a connection 18 which is indicated in FIG. 1 merely diagrammatically as it may be of various different designs and through which the wort after being freed of the spent hops can flow down into the cooling and settling vat 2. The hot vapor rising within the hops strainer 3 and the heat radiated from the wort in the hops strainer heats the intermediate bottom 9 which forms the upper wall or cover of strainer 3 and the bottom of warm water container 4, so that the water contained in the warm water container 4 will thus also be heated. Even if the warm water in container 4 should have reached a higher temperature than that of bottom 9, the heating of this intermediate bottom will effectively prevent a loss of heat through this bottom. At such time pipe coils 17 through which the hot hops flow serve as heating coils.

Warm water container 4 contains a pipe 20 which is mounted so as to be pivotable about an axis 19 and has on its outer end a float 20' so as to maintain this end always at a point immediately below the surface of the warm water so that the water which has been heated to the highest temperature may be drawn off the container 4 through pipe 20. In the particular embodiment as shown in FIG. 1, this pivotable pipe 20 communicates with the hot water container 6 through a pipe 21 which preferably terminates near the bottom of container 6. The warm water may be conducted from container 4 into container 6 either by an increased pressure in container 4 or by means of a pump, not shown, which may be interposed in pipe line 21.

Directly above the warm water container 4 is the condensate receiver 5 which is supplied through pipe 22 with the condensate of the heating steam from the kettles in the brew house, as indicated by arrow along pipe 22.

The steam condensate expands in receiver 5 with the result that the steam rises therein upwardly. In order to utilize this expanded steam for further increasing the temperature of the hot water in the hot water container 6, the latter is provided at the inside with pipe coils 23 through which the expanded steam is passed and then conducted away. The heat contained in the expanded steam is thus transmitted to the hot water in container 6 through the intermediate bottom 11 of this container and also through coils 23. However, the condensate in receiver 5 at the same time heats up the intermediate bottom 10 which forms the bottom of receiver 5 and also the upper wall or cover of warm water container 4, so that the heat of the condensate which is radiated downwardly is utilized for heating the warm water in container 4.

In the event that the hot water in container 6 should not be sufficiently heated in the manner as above described, additional heating coils 25 may be mounted in container 6 for heating the hot water additionally by means of steam.

For transferring the wort from the cooling and settling vat 2 to the wort cooler 1, the former is provided with a pipe 27 which is pivotable about the axis 26 and the outer end of which is provided with a float 27' which maintains the end at a point immediately underneath the surface of the wort in the same manner as described with respect to pipe 20. This pipe 27 is used for drawing off the wort from its upper surface in vat 2 and then passing it to the wort cooler through a connecting pipe 28, as indicated diagrammatically in FIG. 1.

While the wort is being prepared, it is supplied from the brew kettle in the direction as shown by arrow 30 through pipe line 16 and coil 17 to hops strainer 3 where it passes through sieve 3' and then through the connection 18 into the cooling and settling vat 2 where the wort is drawn off the top through pipe 27 and passed through connecting line 28 to wort cooler 1. Simultaneously, cold water flows in the direction shown by arrows 31 through the heat-exchanging pipes 13 in wort cooler 1 and through coils 14 in the cooling and settling vat 2 and then into the warm water container 4 in which the water is further heated by the hot wort flowing through coils 17. The water is then drawn off the upper surface in vat 4 through pipe 20. Therefore, the water which has been heated in vat 4 to the highest temperature flows through pipe line 21 in the direction shown by arrow 32 into the hot water container 6 where it is still further heated by the expanded steam flowing through coils 23 and possibly also by the additional steam flowing through coils 25.

The particular manner of construction of the brewery plant according to the invention results in a considerable saving in space and also in the advantage that the heat coming from the brew house which is no longer of any other use is utilized for producing warm and hot water at a very high degree of efficiency. Pipes 33 and 34 indicate the drains from the warm water container 4 and the hot water container 6.

In the modification of the invention as illustrated in FIG. 2, all of those parts which are substantially similar to those shown in FIG. 1 are indicated by the same reference numerals plus 100. Thus, the embodiment as shown in FIG. 2 similarly includes a wort cooler 101, a cooling and settling vat 102, a hops strainer 103, a warm water container 104, a condensate receiver 105, and a hot water container 106, all in a superimposed relation above each other. However, this embodiment differs from that illustrated in FIG. 1 by the addition of a set of superimposed brew house vessels between the hops strainer 103 and the warm water container 104. The bottom 109 of warm water container 104 therefore forms the upper wall or cover of a mash copper 140 which, if desired, might be subdivided by partitions, while the bottom 141 of a wort boiler 142 also forms the upper wall of the hops strainer 103. Wort boiler 142 communicates directly with hops strainer 103, for example, by a short piece of pipe 143 extending through the bottom 141 of wort boiler 142 into strainer 103. In this set of brew house vessels which is known as such, although not in the arrangement and combination with the other containers as illustrated in FIG. 2 nor for a purpose similar to that of the invention, a clarifying vat 144 is disposed between mash copper 140 and wort boiler 142. As illustrated diagrammatically in FIG. 2, this clarifying vat also contains a mechanism 145 for cutting up and expelling the spent grains. This clarifying vat 144 may also be replaced by a mash filter.

Wort boiler 142, clarifying vat 144, and mash copper 140 are separated from each other in a manner similarly as the individual vessels shown in FIG. 1, namely, by intermediate bottoms 146 and 147. The intermediate bottoms 141 and 147 are provided in a manner known as such with heating pipes 141' and 147'. The condensate forming in these pipes 141' and 147' is conducted through pipe lines 148, 149, and 150 to condensate receiver 105.

The cold water is supplied to the warm water container 104 in a similar manner as in the first embodiment, namely, through heat-exchanging pipes 113 in wort cooler 101, coils 114 in the cooling and settling vat 102, and pipe lines 115.

The warm water is likewise drawn off the upper surface of container 104 as in the first embodiment by a pivotable pipe 120 and passed through a pipe line 121 to the hot water container 106. Arrows 131 and 132 indicate the direction of flow of the water.

FIG. 2 also illustrates an example of the utilization of the warm water produced according to the invention. It shows another pipe line 150 through which the warm water which is drawn off container 104 through pipe 120 in the direction shown by arrow 151 is conducted into the hops strainer 103 for washing out the hops. Similarly, hot water may be drawn off the upper surface of the hot water container 106 by means of a pivotable pipe 152 and be passed through a pipe line 153 in the direction shown by arrow 154 to clarifying vat 144 for sparging a draft therein.

FIG. 2 also illustrates that the heat of a condenser 156 for cooling the boiler fumes may be further utilized. For this purpose, the cold water passing through the heat-exchanging pipe 113 is branched off through a pipe line 155 and passed in the direction shown by arrows 158 through the cooling system of condenser 156 and then through a pipe line 157 to the hot water container 106.

The embodiment of the invention illustrated in FIG. 2 also differs from that shown in FIG. 1 by the fact that the false or intermediate bottoms forming the individual containers and separating them from each other are of an inverted, downwardly curved dome shape. This has the advantage that the superimposed vessels may be connected with each other at the lowest point of their bottoms by means of simple apertures or short pieces of pipe. Such outlet or drain pieces are indicated in FIG. 2 in the bottoms of the mash copper 140, the wort boiler 142, the hops strainer 103, the cooling and settling vat 102, and the wort cooler 101 at 160, 143, 161, 162, and 163, respectively.

The operation of the apparatus according to FIG. 2 substantially corresponds to that illustrated in FIG. 1. Crushed malt and water to be doughed in is first supplied to the mash copper 140 through suitable pipe lines, not shown. The mash then flows through the outlet 160 to the clarifying vat 144. The wort which has been clarified in vat 144 is then passed through an outlet passage 146' in the bottom 146 to the wort boiler 142 from which it subsequently flows through outlet 143 into the hops strainer 103 where it is freed from the spent hops by the sieve 103'. The purified wort then flows through outlet 161 into the cooling and settling vat 102 where it is drawn off the upper surface by the pivotable pipe 127 and passed through outlet 162 into the wort cooler 101. Finally, the wort may be drawn off through outlet 163 ready for the fermenting room.

This flow of the wort thus proceeds in a downward direction and opposite to the upward flow of the water. Since the flow of the water in the embodiment according to FIG. 2 proceeds in a similar manner and direction as described with respect to the embodiment according to FIG. 1, no additional description thereof will be necessary.

Apart from the mentioned advantages of the invention of utilizing the heat of brewery apparatus, which previously was wasted, in the most economical manner, the new apparatus also has the great advantage of being of a very simple construction. In both embodiments as shown in FIGS. 1 and 2, all of the vessels may be combined so as to form a single unit in the shape of a single upright towerlike container as indicated in FIG. 1 by the numeral 12 and in FIG. 2 by the numeral 112. In this connection it is also very valuable that practically no pipe lines are required for conducting the wort from one container to the other since it can flow by its own gravity from one container to the one underneath through mere drain outlets or short pieces of pipe in the false or intermediate bottoms separating the individual containers from each other.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. A brewery apparatus comprising vessel means for producing the wort, a warm water container disposed directly above said wort vessel means, and being heated thereby, the bottom of said warm water container forming the upper wall of said wort vessel means, a cooling vat disposed underneath said vessel means and including means for conducting wort from the vessel means thereto, cooling means in said cooling vat including cooling water passages separated from the wort to cool the wort, and pipe means communicating with said cooling means for carrying water therefrom to said warm water container.

2. A brewery apparatus according to claim 1, including a condensation collector above said warm water container and a further water container above said collector, said condensation collector being in heat exchange relationship with each of said containers, and means for conducting water from said first-mentioned container to the other container above said collector, and means for withdrawing water from the container above said condensation collector after the water has been heated in passing through said cooling means and said containers.

3. A brewery apparatus comprising a hops strainer, a warm water container disposed directly above said hops strainer and being heated thereby, the bottom of said warm water container forming the upper wall of said hops strainer, a wort boiler, and pipe coils within said warm water container for conducting the wort from said wort boiler into said hops strainer and for thereby heating the water in said container.

4. A brewery apparatus comprising a hops strainer, a warm water container disposed directly above said hops strainer and being heated thereby, the bottom of said warm water container forming the upper wall of said hops strainer, a cooling and settling vat disposed directly underneath said hops strainer, pipe coils within said cooling and settling vat and terminating into said warm water container, and means for conducting cooling water through said coils into said container, said cooling water being heated while passing through said coils.

5. A brewery apparatus comprising a hops strainer, a warm water container disposed directly above said hops strainer and being heated thereby, the bottom of said warm water container forming the upper wall of said hops strainer, pipe coils within said cooling and settling vat and terminating into said warm water container, and means for conducting cooling water through said coils into said container, said cooling water being heated while passing through said coils, a wort cooler disposed directly underneath said cooling and settling vat, pipe coils within said wort cooler and within said cooling and settling vat and connected to each other, said pipe coils leading from said cooling and settling vat terminating into said warm water container, and means for conducting cooling water successively through said coils in said wort cooler and said coils in said cooling and settling vat and then into said container, said water being heated while passing through said coils.

6. A brewery apparatus comprising a plurality of vessels including a wort cooler, a cooling and settling vat, a hops strainer, a warm water container, a condensate collecting vessel, and a hot water container, all of said vessels being disposed above each other in the stated order of succession, so that said wort cooler forms the lowest vessel and said hot water container forms the uppermost vessel, water cooling passage means in said vat for cooling the wort therein, means for successively passing water from said cooling passage means through said warm water container and said hot water container to progressively heat said water, means for withdrawing water from said hot water container, and means for progressively passing wort from said hops strainer through said cooling and settling vat and said wort cooler.

7. An apparatus as defined in claim 6, further comprising a plurality of brew house vessels interposed between said hops strainer and said warm water container, said brew house vessels including a mash copper and a wort boiler, the bottom of said warm water container forming the upper wall of said mash copper, and the bottom of said wort boiler forming the upper wall of said hops strainer.

8. An apparatus as defined in claim 5, further comprising a condenser for cooling and condensing gaseous boiler fumes, and means for branching off cooling water from said pipe coils after passing through said wort cooler and for conducting said cooling water through said condenser and after being heated up by said condenser into said hot water container.

9. An apparatus as defined in claim 6, wherein said vessels together form an upright container and are individually formed by common outer walls and by intermediate bottoms separating said vessels from each other.

10. An apparatus as defined in claim 7, wherein all of said vessels including said brew house vessels together form an upright, towerlike container and are individually formed by common outer walls and intermediate bottoms separating said vessels from each other.

11. A brewery apparatus comprising a plurality of vessels including a wort cooler, a cooling and settling vat, a hops strainer, a warm water container, a condensate collecting vessel, and a hot water container, all of said vessels being disposed above each other in the stated order of succession, so that said wort cooler forms the lowest vessel and said hot water container forms the uppermost vessel, a condenser for cooling and condensing gaseous boiler fumes, and means for conducting cooling water through said condenser and for passing said cooling water after being heated up by said condenser into said hot water container.

12. Brewery apparatus, comprising means for preparing and heating wort including at least one wort heating vessel and a hops strainer, means for conducting heated wort from said heating vessel to the hops strainer, at least one container communicating with said hops strainer for receiving wort therefrom, cooling means arranged within said one container and providing cooling water passages separated from the wort for cooling the latter, a water tank disposed above said first-mentioned means for receiving heat therefrom and means for conducting water from said cooling passages in said container to said tank.

13. Brewery apparatus according to claim 12, including a condensation collector above said first-mentioned tank and a further water tank arranged above said collector, said condensation collector being in heat exchange relationship with each of said tanks, and means for conducting water from said first-mentioned tank to the other tank above said collector, said last-mentioned means including a float controlled conduit means for withdrawing water from a point near the surface of the water in said first-mentioned tank.

14. Brewery apparatus comprising means including at least one vessel for boiling wort, a hops strainer, means for conducting wort from said vessel to said hops strainer, at least one container communicating with said hops strainer for receiving heated wort therefrom, water cooling passage means arranged within said container for cooling the wort therein, said passage means being sealed with respect to the wort, a water tank arranged above the hops strainer in such manner that the base of the water tank forms the top of the hops strainer in a position to be heated by the latter, means for conducting water from said cooling passages into said tank and means for extracting heated water from said tank.

15. Brewery apparatus according to claim 13, wherein the means for conducting wort from the wort boiler to the hops strainer includes pipes within the water tank to provide additional heating of the water therein by heated wort passing through the pipes.

References Cited in the file of this patent

UNITED STATES PATENTS

| | | |
|---|---|---|
| 20,488 | Habich | June 8, 1858 |
| 1,028,555 | Donald | June 4, 1912 |
| 1,060,500 | Salmon | Apr. 29, 1913 |
| 2,309,989 | Saltzman | Feb. 2, 1943 |
| 2,354,092 | Stein | July 18, 1944 |
| 2,354,093 | Stein | July 18, 1944 |
| 2,359,876 | Schwaiger | Oct. 10, 1944 |
| 2,775,522 | Coutts | Dec. 25, 1956 |
| 2,827,845 | Richieson | Mar. 25, 1958 |